(12) United States Patent
Skola

(10) Patent No.: US 10,556,703 B1
(45) Date of Patent: Feb. 11, 2020

(54) PREDICTIVE AIRCRAFT PERFORMANCE SYSTEMS AND METHODS

(71) Applicant: Rockwell Collins, Inc., Cedar Rapids, IA (US)

(72) Inventor: John R. Skola, Cobden, IL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 192 days.

(21) Appl. No.: 15/629,654

(22) Filed: Jun. 21, 2017

(51) Int. Cl.
  *B64D 31/06* (2006.01)
  *G08G 5/00* (2006.01)
  *G05B 13/02* (2006.01)

(52) U.S. Cl.
  CPC ......... *B64D 31/06* (2013.01); *G05B 13/0265* (2013.01); *G08G 5/003* (2013.01)

(58) Field of Classification Search
  USPC ............................................................ 701/3
  See application file for complete search history.

(56) References Cited

U.S. PATENT DOCUMENTS

| | | | | |
|---|---|---|---|---|
| 2003/0074171 | A1* | 4/2003 | Desai | G05B 17/02 703/8 |
| 2014/0005861 | A1* | 1/2014 | Mere | G08G 5/0039 701/3 |
| 2016/0140853 | A1* | 5/2016 | Smith | G08G 5/0091 701/415 |
| 2016/0236790 | A1* | 8/2016 | Knapp | B64C 11/001 |
| 2018/0268722 | A1* | 9/2018 | Meier | G08G 5/0047 |

* cited by examiner

*Primary Examiner* — Tyler D Paige
(74) *Attorney, Agent, or Firm* — Donna P. Suchy; Daniel M. Barbieri

(57) ABSTRACT

A system includes a flight parameter database and an avionics controller circuit. The flight parameter database is configured to store at least one ownship operation parameter for the ownship. The avionics controller circuit is configured to determine an expected value of a flight performance parameter for the ownship based on the at least one ownship operation parameter, receive a current value of the flight performance parameter from a sensor of the ownship, determine a difference between the expected value of the flight performance parameter and the current value of the flight performance parameter, and adjust the at least one ownship operation parameter to reduce the difference.

20 Claims, 5 Drawing Sheets

PREDICTIVE AIRCRAFT PERFORMANCE SYSTEMS AND METHODS

BACKGROUND

The inventive concepts disclosed herein relate generally to the field of avionics systems. More particularly, embodiments of the inventive concepts disclosure relate to systems and methods for real time and historical aircraft performance prediction.

In existing aircraft operations, a pilot or other crew member often must estimate various factors associated with performing a flight, such as useful load, range, endurance, required refueling points, and determining an amount of fuel required for the flight. This estimation may be determined based on or otherwise associated with a flight plan for operation of the aircraft. However, flight performance information is typically inaccurate given differences in characteristics across aircraft, which may result from the age of engines and other components, the accuracy of torque sensors or other sensors, or misalignment between components. For example, torque values can be a main driver for performance calculations, but torque sensors may have accuracy errors on the order of ten percent, which may be exacerbated by losses in the aircraft transmission due to wear and tear.

When estimating performance factors, such as fuel required, the pilot may have to make a mental guess in order to manually adjust the fuel requirements suggested by existing performance models. However, such manual adjustments risk overestimation, which may be expensive and/or inefficient, or underestimation, which may require unplanned refueling stops or other undesired or hazardous operation of the aircraft.

SUMMARY

In one aspect, the inventive concepts disclosed herein are directed to a system. The system includes a flight plan database, a flight parameter database, and an avionics controller circuit. The flight plan database is configured to store a flight plan for an ownship. The flight parameter database is configured to store at least one ownship operation parameter for the ownship. The avionics controller circuit is configured to determine an expected value of a flight performance parameter for the ownship based on the flight plan and the at least one ownship operation parameter, receive a current value of the flight performance parameter from a sensor of the ownship, determine a difference between the expected value of the flight performance parameter and the current value of the flight performance parameter, and adjust the at least one ownship operation parameter to reduce the difference.

In a further aspect, the inventive concepts disclosed herein are directed to an airborne platform. The airborne platform includes a sensor configured to detect a flight performance parameter, and a avionics controller circuit. The avionics controller circuit includes a flight plan database storing a flight plan, a flight parameter database storing at least one ownship operation parameter, a flight history database storing at least one historical performance parameter, and an avionics controller. The avionics controller is configured to determine an ordered sequence of expected values of a flight performance parameter based on the flight plan, the at least one ownship operation parameter, and the at least one historical parameter. The avionics controller is configured to receive a current value of the flight performance parameter from the sensor. The avionics controller is configured to update an ordered sequence of actual values of the flight performance parameter based on the current value. The avionics controller is configured to determine a difference between the ordered sequence of expected values of the flight performance parameter and the ordered sequence of actual values of the flight performance parameter. The avionics controller is configured to adjust the at least one ownship operation parameter to reduce the difference between the ordered sequence of expected values of the flight performance parameter and the ordered sequence of actual values of the flight performance parameter.

In a further aspect, the inventive concepts disclosed herein are directed to a method. The method includes retrieving, by an avionics controller circuit, a flight plan for an ownship from a flight plan database. The method includes retrieving, by the avionics controller circuit, at least one ownship operation parameter for the ownship from a flight parameter database. The method includes determining, by the avionics controller circuit, an expected value of a flight performance parameter for the ownship based on the flight plan and the at least one ownship parameter. The method includes receiving, at the avionics controller circuit, a current value of the flight performance parameter from a sensor of the ownship. The method includes determining, by the avionics controller circuit, a difference between the expected value of the flight performance parameter and the current value of the flight performance parameter. The method includes adjusting, by the avionics controller circuit, the at least one ownship parameter to reduce the difference between the expected value of the flight performance parameter and the current value of the flight performance parameter.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
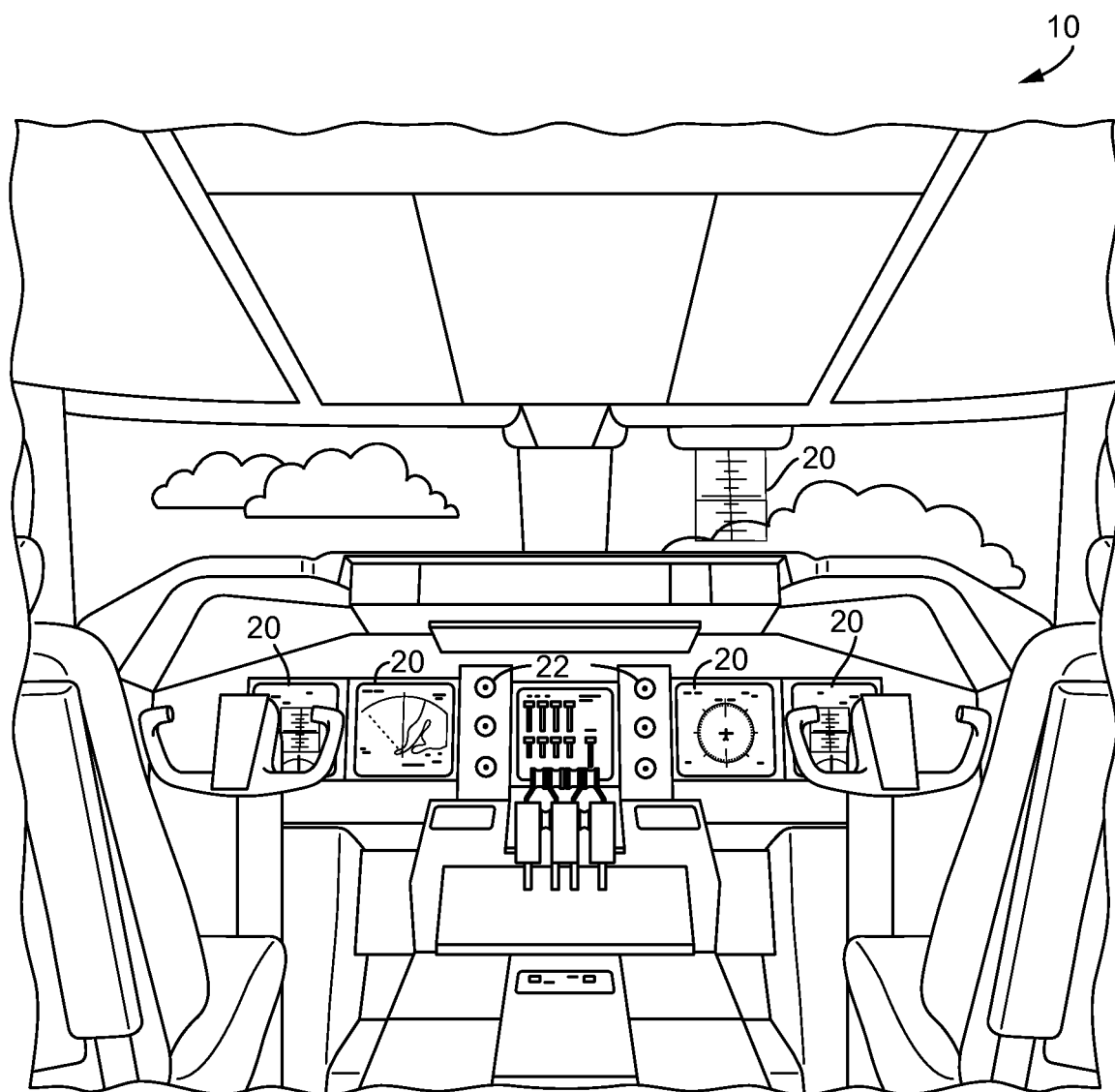
FIG. 1 is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for predictive aircraft performance, including historical and real time aircraft performance predictive modeling for improving aircraft performance. The inventive concepts disclosed herein can be utilized in a number of control systems for various types of electronic avionics applications for airborne platforms (e.g., aircraft, fixed-wing aircraft, rotary-wing aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a flight parameter database and an avionics controller circuit. The flight parameter database is configured to store at least one ownship operation parameter for the ownship. The avionics controller circuit is configured to determine an expected value of a flight performance parameter for the ownship based on the at least one ownship operation parameter, receive a current value of the flight performance parameter from a sensor of the ownship, determine a difference between the expected value of the flight performance parameter and the current value of the flight performance parameter, and adjust the at least one ownship operation parameter to reduce the difference.

The system can be integrated with an airborne platform or other platform as described herein. For example, the system can be implemented as an avionics controller for controlling flight operations of an airborne platform.

Systems manufactured in accordance with the inventive concepts disclosed herein can improve the performance of aircraft and other platforms by predicting performance of the aircraft based on known parameters, such as how an aircraft is to be operated during a specific type of flight, identifying differences between predicted performance and actual performance, and correcting the known parameters to better represent performance. For example, an aircraft's fuel burn rate may be more effectively predicted to account for aircraft-specific torque measurement errors, drivetrain power losses, engine wear power losses, and/or sensor calibration errors, such as to improve how fuel burn is executed during the course of a flight. As such, fuel loading, fuel burn, cruise speeds (e.g., based on engine efficiency curves), and other parameters associated with control and operation of the aircraft can be improved. In some embodiments, airborne platforms in accordance with the inventive concepts disclosed herein can be operated more efficiently than existing systems, even on routes which the airborne platform has not flown.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2A:
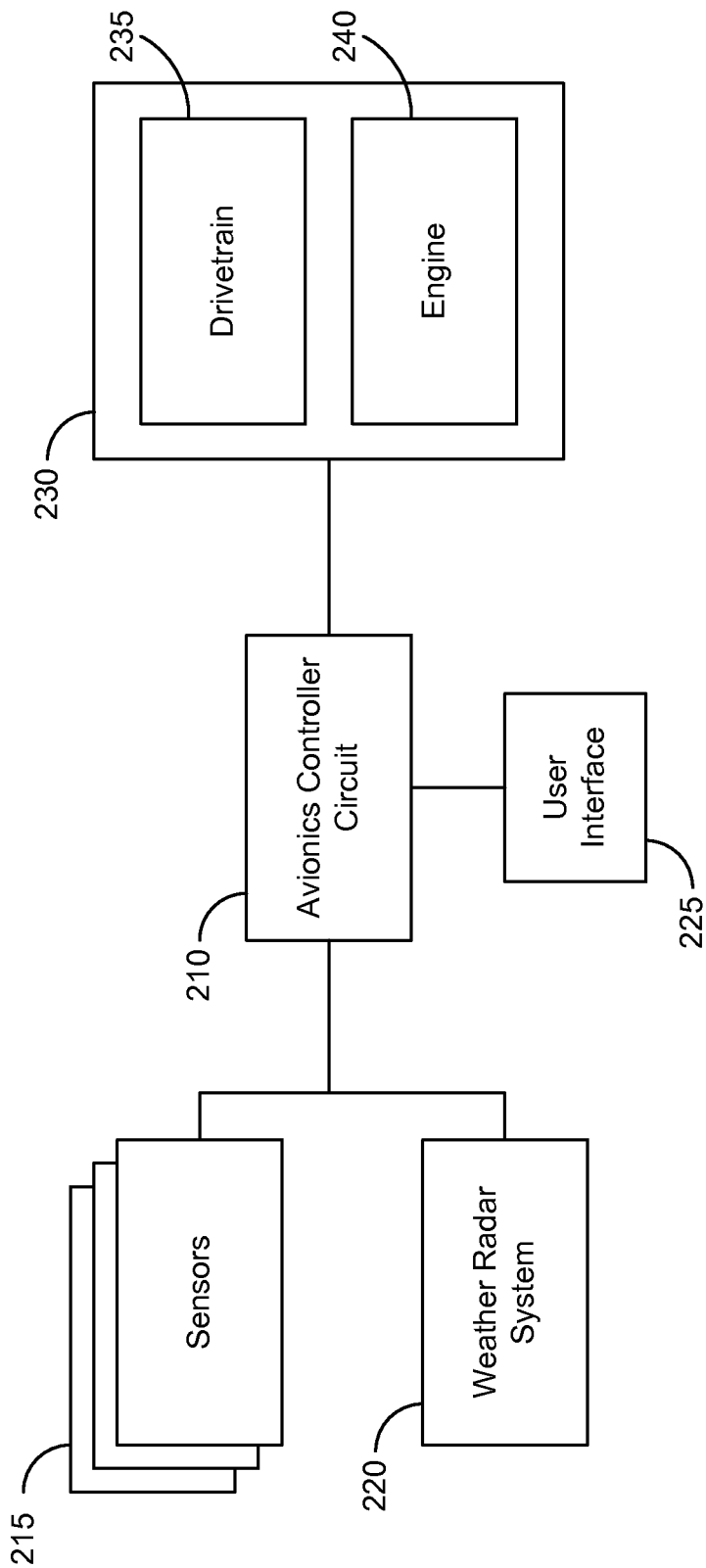
FIG. 2A is a block diagram of an exemplary embodiment of a system for providing predictive aircraft performance and operation according to the inventive concepts disclosed herein.

Referring to FIG. 2A, a block diagram of a system 200 is shown according to an exemplary embodiment of the inventive concepts disclosed herein. The system 200 may be implemented on an aircraft, airborne platform, or other platform (e.g., an ownship). The system 200 may be implemented to improve fuel burn and other performance parameters of the airborne platform.

In some embodiments, the system 200 includes an avionics controller circuit 210. The avionics controller circuit 210 (e.g., control circuit, processing circuit, processing electronics) can include a processor 212 and memory 214. The processor 212 may be implemented as a specific purpose processor, an application specific integrated circuit (ASIC), one or more field programmable gate arrays (FPGAs), a group of processing components, or other suitable electronic processing components. The memory 214 is one or more devices (e.g., RAM, ROM, flash memory, hard disk storage) for storing data and computer code for completing and facilitating the various user or client processes, layers, and modules described in the present disclosure. The memory 214 may be or include volatile memory or non-volatile memory and may include database components, object code components, script components, or any other type of information structure for supporting the various activities and information structures of the inventive concepts disclosed herein. The memory 214 is communicably connected to the processor 212 and includes computer code or instruction modules for executing one or more processes described herein. The memory 214 includes various circuits, software engines, and/or modules that cause the processor 212 to execute the systems and methods described herein, such as the components described with reference to FIG. 2B further herein.

The avionics controller circuit 210 can be configured to control operation of various aspects of the airborne platform. For example, the avionics controller circuit 210 can be configured to control thrust or heading of the airborne platform. The avionics controller circuit 210 can be configured to control a fuel burn rate of the airborne platform. The avionics controller circuit 210 can control maneuvering of the airborne platform. In some embodiments, the avionics controller circuit 210 is configured to execute performance prediction of the airborne platform, as described below with reference to FIG. 2B.

The system 200 may include one or more sensors 215. The sensors 215 can be configured to detect, generate, and/or output sensor data associated with the airborne platform. The sensors 215 can include position sensors, altitude sensors, attitude sensors, or air data sensors (e.g., barometric pressure sensor). The sensors 215 can include at least one of an inertial measurement unit (IMU), an accelerometer, a gyroscope, a GPS unit, a global navigation satellite system (GNSS), or a magnetometer (e.g., magnetic compass). The sensors 215 be configured to output sensor data associated with an operation of the airborne platform, such as engine temperature, a sensed torque, or a temperature of a transmission or other drivetrain component. The sensors 215 can include an outside air temperature sensor. The sensors 215 can be configured to output aircraft state data, such as airspeed, velocity, or acceleration.

In some embodiments, the system 200 includes a fuel sensor 215. The fuel sensor 215 can be configured to output an indication of fuel burn. For example, the fuel sensor 215 can output a fuel level. The avionics controller circuit 210 can calculate a fuel burn based on sensor data received from the fuel sensor 215 (e.g., fuel burn can be defined as an initial fuel level minus a current fuel level). The avionics controller circuit 210 can be configured to calculate an instantaneous (e.g., current, nearly instantaneous) or average fuel burn rate based on sensor data received from the fuel sensor 215 (e.g., average fuel burn rate can be defined as initial fuel level minus current fuel level, divided by elapsed flight time; instantaneous fuel burn rate can be determined as a derivative of the fuel burn, such as fuel level at a previous time minus current fuel level, divided by elapsed time from the previous time, where the previous time may be on the order of seconds or less before the current time).

In some embodiments, the system 200 includes a weather radar system 220. The weather radar system 220 can be configured to transmit a radar signal, receive a corresponding return radar signal, and determine weather information based on the transmitted radar signal and the return radar signal.

In some embodiments, the system 200 includes a user interface 225. The user interface 225 can be configured to receive control commands for operation of the airborne platform. The user interface 225 can be configured to receive flight plan instructions. The user interface 225 can include the flight displays 20 and UI elements 22 described with reference to FIG. 1.

The system 200 can include a platform operation system 230. For example, as shown in FIG. 2A, the system 200 includes a platform operation system 230 include a drivetrain 235 and an engine 240. The platform operation system 230 may also include rotors (e.g., for helicopters), rudders, ailerons, flaps, elevators, and other components for controlling movement of the airborne platform. As will be appreciated, the engine 240 can be configured to convert fuel to kinetic energy to drive the drivetrain 235 to cause movement of the airborne platform. The avionics controller circuit 210 can be configured to generate and transmit control commands to the platform operation system 230, such as to control movement operations of the airborne platform, including to control thrust based on fuel burn by the airborne platform.

Figure 2B:
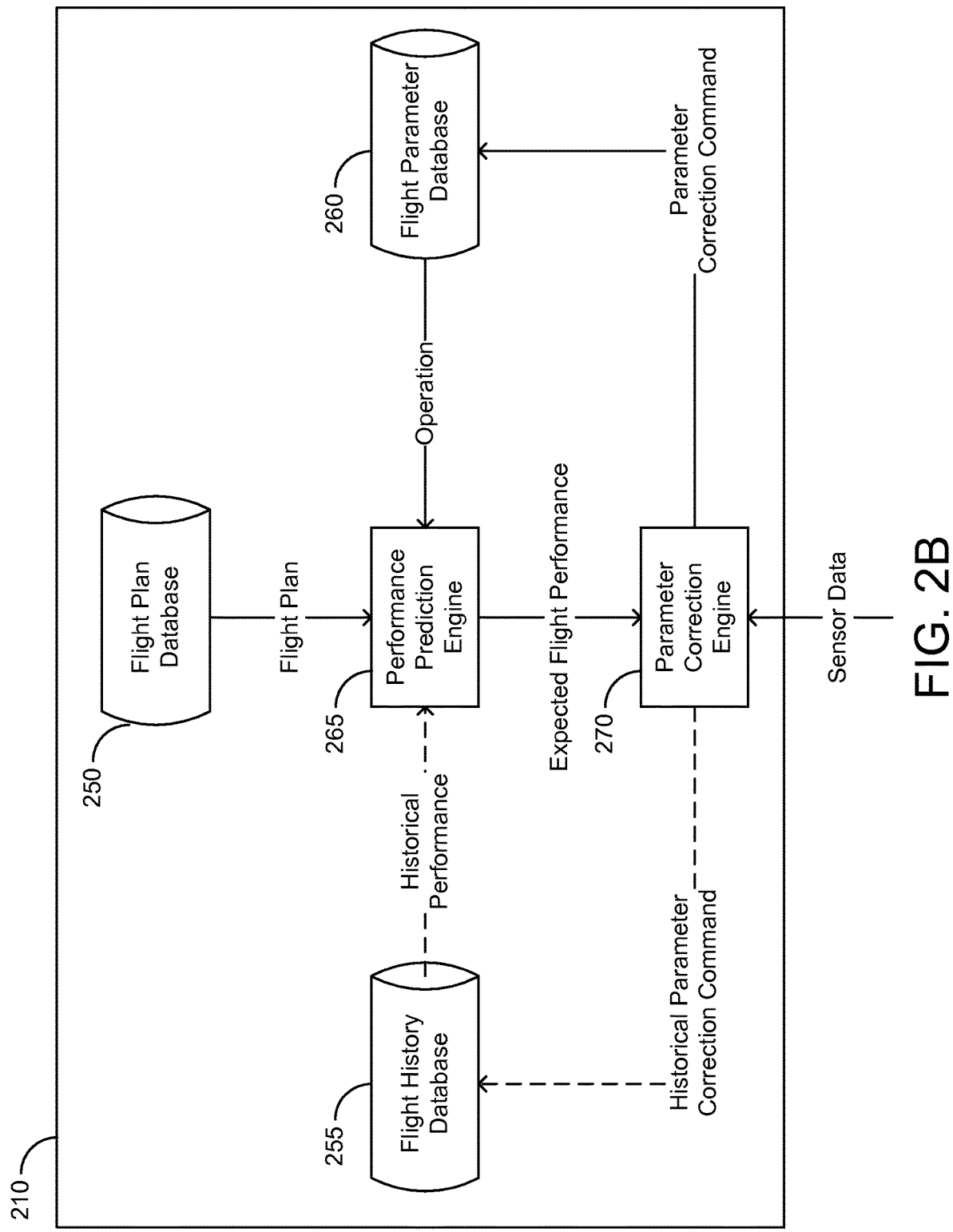
FIG. 2B is a block diagram of an exemplary embodiment of the avionics controller circuit of FIG. 2A.

Referring now to FIG. 2B, a block diagram illustrating an embodiment of the avionics controller circuit 210 of FIG. 2A is shown according to an exemplary embodiment of the inventive concepts disclosed herein. Briefly, the avionics controller circuit 210 can include a flight plan database 250, a flight history database 255, a flight parameter database 260, a performance prediction engine 265, and a parameter correction engine 270. It will be appreciated that the parameters stored by the databases 250, 255, 260 may be organized in various combinations (e.g., the ownship parameters described with reference to flight parameter database 260 may additionally or alternatively be stored and/or updated by flight history database 255). The parameter correction engine 270 can be configured to generate correction factors for modifying parameters stored by the databases 250, 255, 260, and/or modifying predicted performance values generated by the performance prediction engine 265, which can improve technical performance of the avionics controller circuit 210 by facilitating improved prediction of performance parameters, and improve operation of the ownship based on the improved prediction of performance parameters, such as by more efficiently burning fuel, or more accurately determining sensor data such as torque losses.

The flight plan database 250 is configured to store a flight plan. The flight plan may include a plurality of waypoints associated with a flight to be performed by the airborne platform. In some embodiments, the flight plan may include maneuver data associated with maneuvers to be performed along the flight plan. For example, each waypoint may be associated with a maneuver to be performed to adjust a course towards a subsequent waypoint; maneuvers may also be associated with positions along the flight path other than waypoints. In some embodiments, the avionics controller circuit 210 is configured to determine a maneuver based on the flight plan. The maneuver may include accelerations (e.g., turns, increases or decreases in velocity) to be executed by the airborne platform to perform the maneuver.

The flight history database 255 is configured to store at least one historical parameter. The at least one historical parameter may correspond to a current flight being performed by the airborne platform, or a plurality of flights being performed by the airborne platform (e.g., some or all flights performed). The flight history database 255 may store historical parameters analogous to those described for the flight parameter database 260 (e.g., historical or logged values of the at least one ownship parameter stored by the flight parameter database 260). The user type parameter may be generated over time (e.g., based on data from one or more flights during the course of the service history of the ownship).

The historical parameters may include logged values for parameters. For example, various components of the ownship (e.g., engines, sensors, electronic hardware, fuel control valves) may output data, such as diagnostic data, which may be stored as logged values by the flight history database 255.

The flight history database 255 may store historical expected values of flight performance parameters as well as historical actual values of flight performance parameters. For example, the flight history database 255 may store historical fuel burns or fuel burn rates of the airborne platform. A first actual value of the ordered sequence of actual values of flight performance parameters may be associated with a current flight (e.g., at takeoff of a current flight).

In some embodiments, the flight history database 255 is configured to store environmental historical parameters, which may be associated with an environmental correction factor as will be described with respect to FIG. 3. The environmental historical parameters may include environmental and/or ambient condition parameters such as altitude, wind speed, temperature, or pressure.

In some embodiments, the flight history database 255 is configured to store vehicle equipment historical parameters, which may be associated with a vehicle equipment correction factor as will be described with reference to FIG. 3. The vehicle equipment historical parameters may indicate an aircraft type of the ownship. For example, the vehicle equipment historical parameter may indicate whether the ownship is a fixed wing or rotary wing platform. The vehicle equipment historical parameter may indicate whether the airborne platform is a CH-47F type, a MH-60M type, or other aircraft type. The vehicle equipment historical parameters may indicate powertrain components of the ownship. For example, the vehicle equipment historical parameters may indicate engine make or model, or vehicle transmission type. Based on the vehicle equipment historical parameters, the avionics controller circuit 210 may be configured to more accurately predict performance parameters and improve operation of the ownship based on the accurate predictions. For example, the vehicle equipment historical parameter may indicate that engines of a particular manufacturer tend to operate poorly (e.g., burn more fuel than expected); together with other parameters, such as environmental historical parameters, the vehicle equipment historical parameter may allow the avionics controller circuit 210 to determine that engines of the particular manufacturer tend to operate poorly in hot conditions.

The at least one historical parameter may include a user type parameter (e.g., mission type parameter) associated with operation of the airborne platform, which may be associated with a user correction factor as will be described with reference to FIG. 3. The user type parameter may indicate a purpose or affiliation of the mission (e.g. special operations, cargo transport, civil—regional airline, civil—commercial or large carrier airline, military—army, military—special forces). The user type parameter may indicate a jurisdiction associated with the flight plan (e.g., an airborne platform operated by a U.S. entity may be operated differently than an airborne platform operated by a Canadian entity).

The flight parameter database 260 is configured to store at least one ownship operation parameter. The at least one ownship parameter may include parameters associated with operation of various components of the airborne platform. The at least one ownship parameter may include parameters associated with sensor errors (e.g., calibration parameters configured to be used to modify a sensor value) and/or power losses (e.g., power loss parameters configured to be used to determine a power loss for operation of the corresponding components of the airborne platform). The at least one ownship parameter may include a torque measurement error parameter, which may be associated with an error of a sensor 215 configured to output an indication of a torque of the airborne platform (e.g., an engine torque). The at least one ownship parameter may include a drivetrain or powertrain power loss parameter. The at least one ownship parameter may include an engine wear power loss parameter. The at least one ownship parameter may include a sensor calibration error parameter (e.g., a calibration value or function which can be used to modify a value received from a sensor). The at least one ownship parameter may include a fuel flow rate associated with a desired engine torque or airspeed. In some embodiments, as will be described below with respect to the performance prediction engine 265 and parameter correction engine 270, the at least one ownship parameter may be used to generated a predicted value of an ownship performance parameter, which may be compared to an instantaneous, actual value detected by a sensor to determine potential modifications to the at least one ownship parameter and improve the at least one ownship parameter to more accurately predict performance parameters.

In some embodiments, the at least one ownship parameter includes an airborne platform identifier, such as a tail number of the airborne platform, which may specifically identify the airborne platform. The airborne platform identifier can represent how a particular ownship typically performs. The airborne platform identifier may be associated with parameters specific to the airborne platform such as torque measurement error parameters, specific engine efficiency parameters, specific drivetrain or powertrain efficiency parameters, or specific sensor calibration values for sensors of the airborne platform. For example, the flight parameter database 260 may include a mapping associating each of a plurality of airborne platform identifiers with corresponding parameters (e.g., corresponding torque measurement error parameter specific to the airborne platform). As such, the avionics controller circuit 210 may be configured to retrieve ownship parameters specific to a selected airborne platform based on the airborne platform identifier.

In some embodiments, the airborne platform identifier of the at least one ownship parameter can be generated based on historical data for the particular ownship. For example, the airborne platform identifier of the at least one ownship parameter be generated based on a history of predicted parameters and actual logged values (e.g., based on comparing predicted flight performance parameters to actual flight performance parameters). Such performance parameters (e.g., instantaneous values of performance parameters, which may be logged over time) may include one or more of outside air temperature, fuel flow, altitude, density, or aircraft load parameters.

In some embodiments, the aircraft type (or vehicle level) parameter may be determined based on components of the ownship. For example, as aircraft parts (e.g., engines, sensors, electronics, mechanical components) are replaced, updated, repaired, or move from one aircraft to another, the at least one ownship parameter can be updated based on modifications to the components of the ownship.

The performance prediction engine 265 can be configured to generate expected flight performance data. For example, the performance prediction engine 265 can determine an expected value of a flight performance parameter for the airborne platform. The performance prediction engine 265 can determine the expected value of the flight performance parameter based on at least one of the flight plan, the at least one historical parameter, or the at least one ownship operation parameter.

The flight performance parameter may include a fuel level or fuel burn rate. The flight performance parameter may include a noise associated with operation of the airborne platform (e.g., a noise associated with operation of jet engines or other engines). The flight performance parameter may be associated with engine emissions. The flight performance parameter may be a thrust generated by the airborne platform (e.g., thrust as a function of fuel burn rate or fuel flow rate). The flight performance parameter may be associated with a torque, such that the performance prediction engine 265 can predict an expected torque required for particular operations (e.g., torque required for hover, torque required for cruise).

The performance prediction engine 265 can retrieve the flight plan from the flight plan database 250. The performance prediction engine 265 can extract a specific waypoint or a plurality of waypoints from the flight plan. For example, the performance prediction engine 265 can receive an aircraft state data value (e.g., position) and extract a waypoint based on the aircraft state data value, such as to extract an upcoming closest waypoint.

The performance prediction engine 265 can be configured to determine the expected flight performance parameter based on at least one of a weight of the airborne platform, an aircraft state of the airborne platform (e.g., a position, velocity, or acceleration of the airborne platform), or an ambient condition (e.g., ambient temperature, ambient pressure).

In some embodiments, the performance prediction engine 265 includes a machine learning engine configured to generate the expected value of the flight performance parameter. The machine learning engine can receive parameters from the databases 250, 255, 260 as learning inputs, generate the expected value of the flight performance parameter. The machine learning engine can use the difference between the expected value of the flight performance parameter and the current value of the flight performance parameter as a cost function (e.g., objective function, optimization function) to be reduced or minimized in order to modify the parameters of the databases 255, 260 to more accurately represent operation of the airborne platform.

As will be appreciated, the databases 250, 255, 260 need not include pre-established relationships (e.g., known functions) between the corresponding stored parameters and the expected values of the flight performance parameters; instead, the machine learning engine can learn/train itself to generate such functional relationships. For example, the machine learning engine may be configured to learn previously unknown or vaguely understood relationships, such as the mission type to be executed by the airborne platform or the tail number of the airborne platform being a significant factor for determining fuel burn rate; as such, the system 200 can improve upon existing systems which depend on known relationships between flight performance parameters such as fuel burn rate and ownship operation parameters such as torque measurement error to plan for fuel burn.

In some embodiments, the performance prediction engine 265 is configured to execute determination of the expected value of the flight performance parameter response to a trigger signal. The trigger signal may include at least one of a user input, a predetermined duration of time expiring, or the ownship being within a threshold distance of a waypoint of the flight plan. The performance prediction engine 265 can be configured to execute determination of the expected value on a regular basis (e.g., by initiating a timer associated with a predetermined expiration time and executing determination of the expected value responsive to the timer expiring). The performance prediction engine 265 can be configured to retrieve a position of the airborne platform (e.g., from a position sensor 215 such as a GPS sensor), determine a distance from the airborne platform to a waypoint retrieved from the flight plan (e.g., an upcoming waypoint), compare the distance to the threshold distance, and execute the determination of the expected value responsive to determining that the distance is less than the threshold distance, such that the performance prediction engine 265 can anticipate fuel burn changes which may occur in the vicinity of waypoints, or otherwise use the waypoints as triggers for determining expected values of flight performance parameters.

In some embodiments, the parameter correction engine 270 is configured to determine a difference between the current value of the flight performance parameter and the expected value of the flight performance parameter. In embodiments where the flight performance parameter is represented as a single value (e.g., single fuel burn rate value), the parameter correction engine 270 can determine the difference by subtracting the expected value from the current value (or vice versa; or by determining an absolute value of the result of the subtraction). In embodiments where the flight performance parameter is represented as a plurality of values (e.g., the flight performance parameter may include several parameters such as fuel burn rate, cruise speed, engine rotation speed, fuel flow rate), the difference may be determined based on comparing corresponding current and expected values for the same flight performance parameter (e.g., comparing current value of cruise speed to expected value of cruise speed), and combining the comparisons (e.g., summing the differences resulting from each comparison, which may be weighted or normalized). In some embodiments, the parameter correction engine 270 can be configured to determine a difference between a current (e.g., actual) fuel burn rate detected by the at least one sensor 215 and a predicted fuel burn rate received from the performance prediction engine 265. In some embodiments, the parameter correction engine 270 can be configured to determine a difference between a current (e.g., actual) torque detected by the at least one sensor 215 and a predicted torque received from the performance prediction engine 265.

The parameter correction engine 270 can be configured to generate a parameter correction command. For example, the parameter correction engine 270 can generate a parameter correction command configured to adjust (e.g., modify, set, define) the at least one ownship operation parameter of the flight parameter database 260. The flight parameter database 260 can receive the parameter correction command and adjust the corresponding at least one ownship operation parameter based on the parameter correction command.

The parameter correction engine 270 can generate the parameter correction command based on the difference between the current value of the flight performance parameter and the expected value of the flight performance parameter. For example, the parameter correction engine 270 can configure the parameter correction engine to increase or decrease a value of the at least one ownship operation parameter to reduce the difference. In some embodiments, the parameter correction engine 270 is configured to generate the parameter correction command based on executing a parametric analysis algorithm. The parameter correction engine 270 can execute a parametric analysis algorithm configured to output at least one association between the at least one ownship parameter and the expected value of the flight performance parameter. The association may indicate a change in the expected value as a function of a change in the at least one ownship parameter. For example, if the performance prediction engine 265 is configured to determine the expected value of the flight performance parameter as:

$$Y = f(x_1, x_2, \ldots x_n)$$

where y is the expected value, and $x_1, x_2 \ldots x_n$ are the at least one ownship parameter, the parameter correction engine 270 can execute the parametric analysis algorithm to calculate partial derivatives $dy/dx_1$ $dy/dx_n$, and then use the partial derivatives to determine the parameter correction command.

In some embodiments, the parameter correction engine 270 is configured to generate the parameter correction command to reduce the difference between the expected value and the current value of the flight performance parameter to be less than a threshold difference. The threshold difference may be a predetermined value. The threshold difference may be established based on computational requirements for operation of the avionics controller circuit 210 (e.g., the threshold difference may be determine such that the parameter correction command can be generated within an appropriate amount of time for determining the parameter correction command, given computational resources of the avionics controller circuit 210, such as to correct parameters on a regular basis).

In some embodiments, the parameter correction engine 270 is configured to generate a historical parameter correction command. For example, the parameter correction engine 270 can generate a historical parameter correction command configured to adjust (e.g., modify, set, define) the at least one historical parameter of the flight history database 255. The flight history database 255 can receive the parameter correction command and adjust the corresponding at least one historical performance parameter based on the parameter correction command.

In some embodiments, the flight performance parameter includes or is associated with a fuel level of the airborne platform. The parameter correction engine 270 can be configured to receive the current value of the flight performance parameter as a fuel level value from the fuel level sensor 215. As described above, the avionics controller circuit 210 can be configured to receive or calculate a fuel burn rate, such as an average or instantaneous fuel burn rate. The parameter correction engine 270 can be configured to use the fuel burn rate as the current value of the flight performance parameter.

In some embodiments, the avionics controller circuit 210 is configured to output the flight history database 255 responsive to identifying an end of flight condition. The avionics controller circuit 210 can identify the end of flight condition based on determining that the airborne platform has landed. The avionics controller circuit 210 can identify the end of flight condition based on determining that the airborne platform is within a threshold distance of a final waypoint of the flight plan. The avionics controller circuit 210 can be configured to update a flight plan based on the difference between the current value of the flight performance parameter and the expected value of the flight performance parameter.

The avionics controller circuit 210 can control operation of the airborne platform based on the difference between the current value of the flight performance parameter and the expected value of the flight performance parameter. The avionics controller circuit 210 can generate a flight control signal for controlling operation of airborne platform components (e.g., engines, steering or other directional controls, fuel flow). For example, the avionics controller circuit 210 can adjust a speed (e.g., cruise speed) of the airborne platform based on the difference. In some embodiments, the avionics controller circuit 210 can generate a control command signal based on the difference and transmit the control command signal to the platform operation system 230 (e.g., to the engine 240) to control operation of the platform operation system 230. The avionics controller circuit 210 can modify a function relating various operational parameters (e.g., an engine curve relating engine rotation speed to torque, an efficiency curve relating cruise speed to fuel burn rate) based on the difference, such as to reduce the difference or otherwise make the function more accurate. For example, the performance prediction engine 265 may generate an expected value for a fuel burn rate corresponding to a first speed.

The parameter correction engine 270 may receive or determine the current value of the fuel burn rate to be greater than the expected value. The avionics controller circuit 210 can determine that the difference between the expected value and current value indicates that the actual performance of the airborne platform is less efficient than predicted (e.g., the airborne platform is burning fuel at a faster rate than expected to achieve the first cruise speed) and adjust the first speed to a second speed to reduce the difference, which may make the airborne platform operate more efficiently. Similar adjustments may be made if the difference indicates that the difference between the expected value and current value indicates that the actual performance is more efficient than predicted. It will be appreciated that the parameter correction engine 270 may also similarly adjust parameters of the flight history database 255 and/or flight parameter database 260, such as to adjust engine curve or efficiency curve parameters stored in the databases 255, 260.

In some embodiments, the performance prediction engine 265 is configured to determine an ordered sequence of expected values of a flight performance parameter based on the flight plan, the at least one ownship parameter, and the at least one historical parameter. The performance prediction engine 265 can receive the at least one historical parameter (e.g., historical performance parameter) from the flight history database 255. The ordered sequence expected values may be ordered based on time. For example, the performance prediction engine 265 can determine expected values such as fuel burn rates over the course of a flight or of a flight plan (e.g., from a first time or position of the flight plan to a second time or position of the flight plan; from a start of the flight plan to a current time or position; from a start of the flight plan to an end of the flight plan).

The performance prediction engine 265 can associate the expected fuel burn rates with time points in order to order the expected fuel burn rates. The ordered sequence of expected values may be used for comparison against a similar sequence of actual or current values of flight performance parameters, which may be generated or updated by the parameter correction engine 270.

The parameter correction engine 270 can receive a current value of the flight performance parameter from the at least one sensor 215 of the airborne platform. The parameter correction engine 270 can initialize, maintain, and/or update an ordered sequence of actual values of the flight performance parameter based on the received current value. For example, the parameter correction engine 270 can generate a sequence of actual values ordered by times at which the actual values were received as current values or generated The parameter correction engine 270 can be configured to determine a difference between the ordered sequence of expected values and the ordered sequence of actual values. The difference can be calculated based on comparing corresponding values associated with the same point in time (e.g., comparing a first expected value corresponding to a first point in time to a first actual value corresponding to the first point in time) in order to determine a plurality of difference values, which may be added, integrated, or otherwise combined to generate a single measure of the difference. The parameter correction engine 270 can be configured to determine an $L_1$ distance, an $L_2$ distance, or other distance measures between corresponding values associated with the same point in time, and sum the distances to determine a single measure of the difference.

The parameter correction engine 270 can be configured to adjust the at least one ownship parameter to reduce the difference between the ordered sequence of expected values and the ordered sequence of actual values, such as to enable the performance prediction engine 265 to more accurately predict the flight performance parameter. Such adjustments may enable the avionics controller circuit 210 to more efficiently control fuel burn by the engine 240 or other components of the platform operation system 230.

Figure 3:
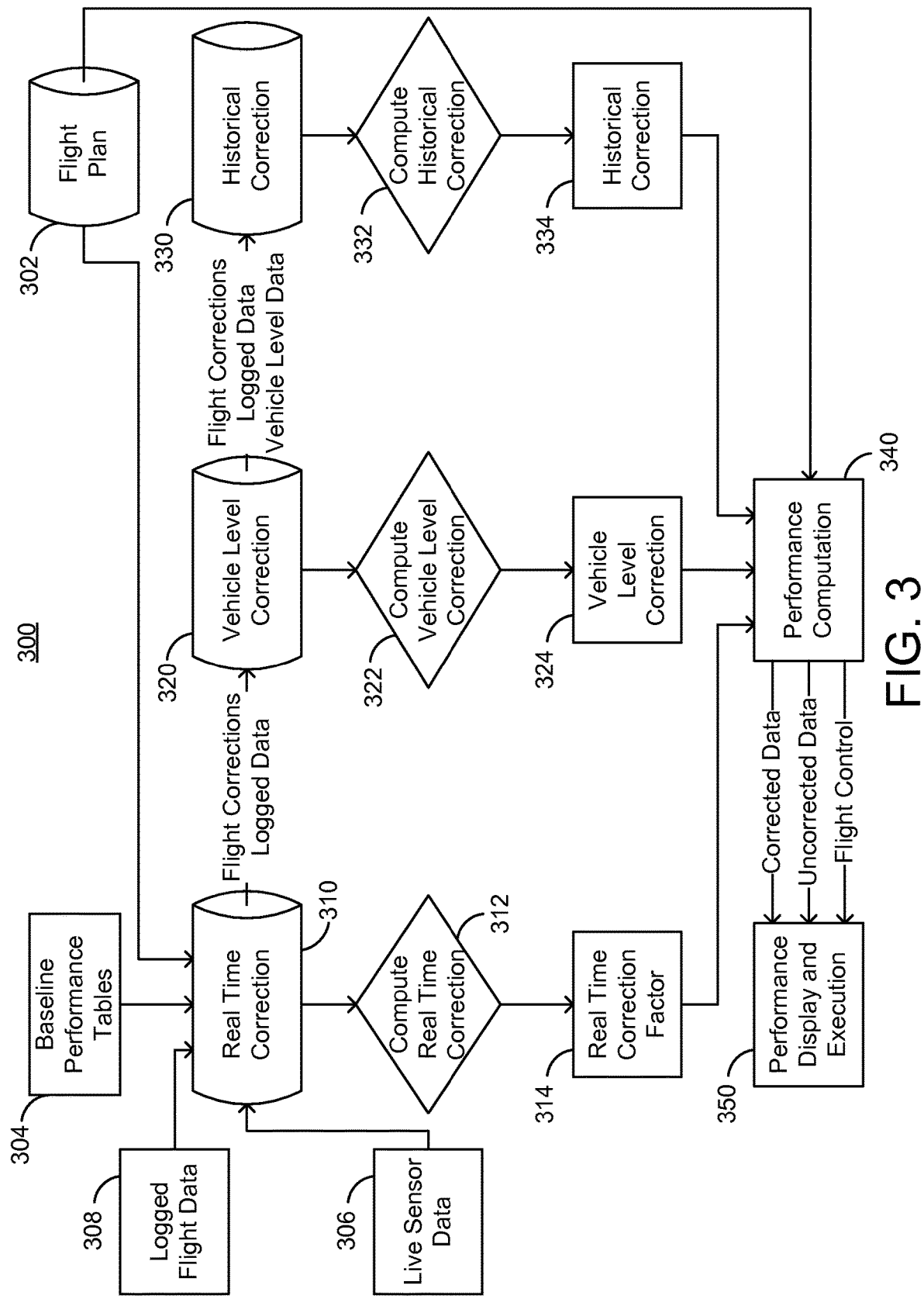
FIG. 3 is a block diagram of an exemplary embodiment of a system for aircraft performance and operation computation, correction, and execution according to the inventive concepts disclosed herein.

Referring now to FIG. 3, a block diagram of a system 300 is shown according to an exemplary embodiment of the inventive concepts disclosed herein. The system 200 may be implemented on an aircraft, airborne platform, or other platform (e.g., an ownship). The system 300 may incorporate features of the system 200 described with reference to FIGS. 2A-2B. The system 300 may be implemented on avionics hardware of an ownship, or may include one or more components implemented remotely from the avionics hardware. Briefly, in some embodiments, the system 300 is configured to calculate corrections to predicted or baseline performance parameters to facilitate improved operation of the ownship.

In some embodiments, a real time correction engine 310 is configured to compute 312 a real time correction factor 314. The real time correction engine 310 can be similar to the parameter correction engine 270 of FIGS. 2A-2B. The real time correction engine 310 can receive baseline performance parameters from baseline performance tables 304, which may represent expected or predicted performance of the ownship (e.g., expected fuel burn rate) as may be generated by existing systems. In some embodiments, the real time correction engine 310 is configured to receive a flight plan from flight plan database 302. The real time correction engine 310 can store parameters regarding real time operation of the ownship similar or identical to the at least one ownship parameter described with reference to flight parameter database 260 of FIG. 2B. The real time correction engine 310 can receive live sensor data 306 from one or more sensors (e.g., the at least one sensor 215 of FIG. 2A), as well as logged flight data 308 (e.g., from engines, transmissions, or other components of the ownship). The real time correction factor 314 can be computed 312 based on information stored and/or received by the real time correction engine. The real time correction engine 310 can store the computed correction factor 314 (e.g., for subsequent performance correction determinations). The correction factor 314 may be used for updating baseline real-time performance predictions (e.g., fuel burn rate, cruise speed, torque requirements).

In some embodiments, a vehicle level correction engine 320 is configured to compute 322 a vehicle level correction factor 324. The vehicle level correction engine 320 can be similar to the parameter correction engine 270 of FIGS. 2A-2B, and can be configured to generate corrections to vehicle level parameters as described with reference to the flight parameter database 260 of FIG. 2B. The vehicle level correction engine 320 can receive flight correction data (e.g., real time correction factors 314) and logged flight data 308. The vehicle level correction factor 324 can represent vehicle level corrections for parameters associated with an aircraft identifier (e.g., tail number), and may represent performance of the ownship even as parts are updated, replaced, or otherwise moved between platforms. The vehicle level correction engine 320 can store and update correction factors 324 over time (e.g., based on calculations and logged data from one or more flights).

In some embodiments, a historical correction engine 330 is configured to compute 332 a historical correction factor 334. The historical correction engine 330 can be similar to the parameter correction engine 270 of FIGS. 2A-2B, and can be configured to generate correction factors for historical parameters as described with reference to the flight history database 255 of FIGS. 2A-2B (e.g., environmental correction factors, user correction factors, vehicle equipment correction factors). The historical correction engine 330 can receive flight correction data (e.g., correction factors 314, 324), logged flight data, and vehicle level data. The historical correction engine 330 can store and update correction factors 334 over time.

The system 300 can include a performance computation engine 340. In some embodiments, the performance computation engine 340 is configured to generate (e.g., predict) flight performance data values, such as fuel burn rates, cruise speeds, or torque requirements. The performance computation engine 340 can generate the flight performance data values based on data retrieved from the baseline performance tables 304 (e.g., to generate performance predictions similar to those generated by existing systems), such as for outputting uncorrected data. The performance computation engine 340 can also modify the flight performance data values based on correction factors 314, 324, 334. For example, the correction factors 314, 324, and/or 334 may each be represented by one or more values which can be added or subtracted to the flight performance data values (e.g., uncorrected data) to generate corrected values (e.g., for outputting corrected data). In some embodiments, the performance computation engine 340 is configured to generate flight control data or commands (e.g., for controlling operation of flight control devices or for flight control cueing, such as to cue recommend maneuvers or other operations based on the parameter corrections).

The system 300 can include a performance display and execution system 350, which may include one or more displays (e.g., flight displays 20), as well as avionics controllers (e.g., incorporating features of avionics controller circuit 210) configured to control operation of the ownship. For example, the performance display and execution system 350 can display at least one of corrected data or uncorrected data received from the performance computation engine 340. The performance display and execution engine 340 can control operation of engines, transmissions, fuel flow control devices, or other components of the ownship based on flight control data or commands received from the performance computation engine 340.

Figure 4:
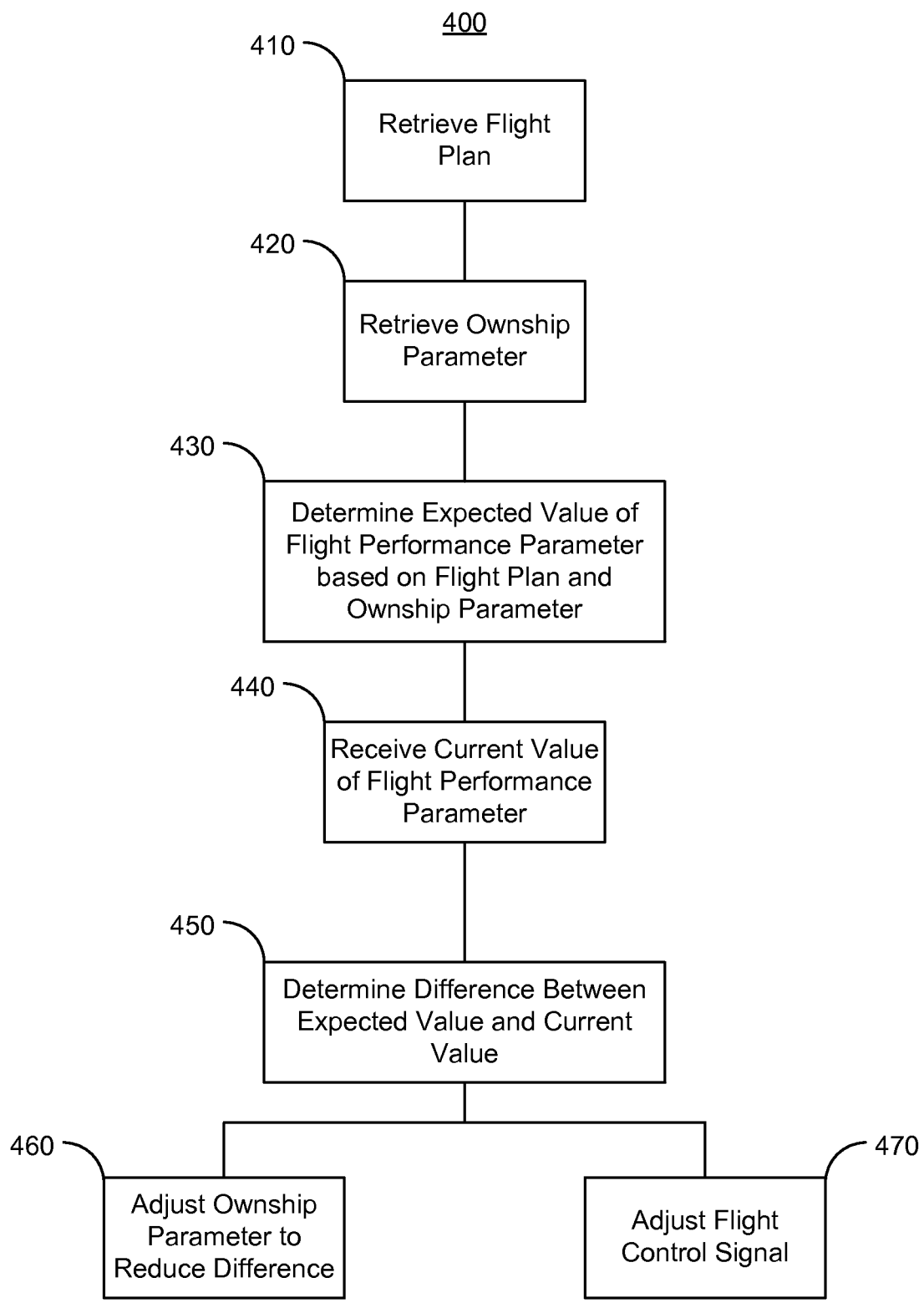
FIG. 4 is a diagram of an exemplary embodiment of a method according to the inventive concepts disclosed herein.

Referring now to FIG. 4, an exemplary embodiment of a method 400 according to the inventive concepts disclosed herein may include the following steps. The method may be performed using various hardware, apparatuses, and systems disclosed herein, such as the cockpit 10, the system 200, or the system 300.

A step (410) may include retrieving, by an avionics controller circuit, a flight plan for an ownship from a flight plan database. The flight plan may include a plurality of waypoints associated with a flight to be performed by the airborne platform. In some embodiments, the flight plan may include maneuver data associated with maneuvers to be performed along the flight plan. In some embodiments, the method 400 may include determining a maneuver based on the flight plan.

A step (420) may include retrieving, by the avionics controller circuit, at least one ownship operation parameter for the ownship from a flight parameter database. The at least one ownship parameter may include parameters associated with operation of various components of the airborne platform, such as sensor errors, power losses, fuel flow rates, or torque measurement. The at least one ownship parameter may indicate an aircraft type of the ownship or a mission type to be performed by the ownship. The at least one ownship parameter may include an identifier of the ownship (e.g., indicate a tail number of the ownship), the identifier associated with at least one of a torque determination error, an engine efficiency, a drivetrain efficiency, or a sensor calibration of the ownship.

A step (430) may include determining, by the avionics controller circuit, an expected value of a flight performance parameter for the ownship based on the flight plan and the at least one ownship parameter. For example, an expected value of a fuel burn rate may be determined based on the flight plan and the at least one ownship parameter.

A step (440) may include receiving, at the avionics controller circuit, a current value of the flight performance parameter from a sensor of the ownship. For example, a current value of a fuel level or fuel burn rate may be received and/or determined based on sensor data received from a fuel level sensor of the ownship.

A step (450) may include determining, by the avionics controller circuit, a difference between the expected value of the flight performance parameter and the current value of the flight performance parameter. The difference may be determined based on comparing (e.g., subtracting) the expected value to the current value.

A step (460) may include adjusting, by the avionics controller circuit, the at least one ownship parameter to reduce the difference between the expected value of the flight performance parameter and the current value of the flight performance parameter.

A step (470) may include adjusting, by the avionics controller circuit, a flight control signal based on the difference between the expected value of the flight performance parameter and the current value of the flight performance parameter.

In some embodiments, the flight performance parameter includes at least one of a fuel burn or a fuel burn rate of the ownship. Determining the expected value of the flight performance parameter may include determining the expected value based on sensor data including at least one of a weight of the ownship, an entity state, or an ambient condition.

As will be appreciated from the above, systems and methods for predictive aircraft performance and operation according to embodiments of the inventive concepts disclosed herein may improve operation of aircraft and other platforms by improving fuel burn, torque selection, cruise speed selection, sensor accuracy, flight planning, and/or flight cueing.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a flight parameter database storing at least one operation parameter for an airborne platform, wherein the operation parameter is associated with operation of at least one component of the airborne platform; and
an avionics controller circuit configured to:
determine an expected value of a flight performance parameter for the airborne platform from a flight history database of the airborne platform based on the at least one operation parameter;
receive a current value of the flight performance parameter from a sensor of the airborne platform;
determine a difference between the expected value of the flight performance parameter and the current value of the flight performance parameter;
adjust the at least one operation parameter to reduce the difference between the expected value of the flight performance parameter and the current value of the flight performance parameter; and
control operation of the at least one component of the airborne platform based on the adjusted at least one operation parameter.

2. The system of claim 1, wherein the flight performance parameter includes a fuel level of the airborne platform, and the sensor is a fuel level sensor.

3. The system of claim 1, wherein the flight performance parameter includes at least one of a fuel burn or a fuel burn rate of the airborne platform, and the avionics controller is configured to determine the expected value of the flight performance parameter further based on sensor data including at least one of a weight of the airborne platform, an entity state, or an ambient condition.

4. The system of claim 1, wherein the at least one operation parameter indicates an aircraft type of the airborne platform or a mission type to be performed by the airborne platform.

5. The system of claim 1, wherein the at least one operation parameter indicates an identifier of the airborne platform, the identifier associated with at least one of a torque determination error, an engine efficiency, a drivetrain efficiency, or a sensor calibration of the airborne platform, the identifier generated by the avionics controller based on a history of at least one predicted operation parameter containing at least one recorded value.

6. The system of claim 1, wherein the avionics controller includes a machine learning engine configured to generate the expected value of the operation parameter from the flight history database of the airborne platform based on at least one operation parameter.

7. The system of claim 1, further comprising a flight plan database configured to store a flight plan for the airborne platform, wherein the avionics controller circuit is configured to determine the expected value of the flight performance parameter for the airborne platform further based on the flight plan.

8. The system of claim 7, wherein the avionics controller is configured to execute the determination of the expected value of the flight performance parameter responsive to at least one of a user input, a predetermined duration of time expiring, or the airborne platform being within a threshold distance of a waypoint of the flight plan.

9. The system of claim 1, wherein the avionics controller is further configured to adjust an airspeed of the airborne platform based on the difference between the current value of the flight performance parameter and the expected value of the flight performance parameter.

10. An airborne platform, comprising:
a sensor configured to detect a flight performance parameter; and
an avionics controller circuit comprising:
a flight parameter database storing at least one operation parameter, wherein the operation parameter is associated with operation of at least one component of the airborne platform;
a flight history database storing at least one historical performance parameter; and
an avionics controller configured to:
determine an expected value of a flight performance parameter based on the at least one operation parameter and the at least one historical parameter;
receive a current value of the flight performance parameter from the sensor;

determine a difference between the expected value of the flight performance parameter and the current value of the flight performance parameter;

adjust the at least one operation parameter used to determine the expected value of the flight performance parameter to reduce the difference between the expected value of the flight performance parameter and the current value of the flight performance parameter; and control operation of the airborne platform based on the adjusted at least one operation parameter.

11. The airborne platform of claim 10, wherein the avionics controller circuit is further configured to determine an ordered sequence of expected values of the flight performance parameter based on the at least one operation parameter and the at least one historical parameter, update an ordered sequence of actual values of the flight performance parameter based on the current value, and determine the difference further based on the ordered sequence of expected values and the ordered sequence of actual values.

12. The airborne platform of claim 11, wherein a first actual value of the ordered sequence of actual values is associated with a current flight, and the ordered sequence of actual values is associated with a plurality of flights.

13. The airborne platform of claim 10, further comprising a flight plan database, wherein the avionics controller circuit is configured to determine the expected value of the flight performance parameter further based on the flight plan.

14. The airborne platform of claim 10, further comprising an engine, wherein the avionics controller circuit is configured at least one of adjust a flow rate of fuel to the engine or adjust an airspeed of the airborne platform based on the difference.

15. The airborne platform of claim 10, wherein the avionics controller circuit is configured to determine the expected value of the flight performance parameter based on executing at least one of an engine curve function or a fuel efficiency function, and adjusting the at least one operation parameter includes adjusting a parameter of the at least one of the engine curve function or the fuel efficiency function.

16. A method, comprising:

retrieving, by an avionics controller circuit, a flight plan for an airborne platform from a flight plan database;

retrieving, by the avionics controller circuit, at least one operation parameter for the airborne platform, wherein the operation parameter is associated with operation of at least one component of the airborne platform, from a flight parameter database;

determining, by the avionics controller circuit, an expected value of a flight performance parameter for the airborne platform based on the flight plan and the at least one operation parameter;

receiving, at the avionics controller circuit, a current value of the flight performance parameter from a sensor of the airborne platform;

determining, by the avionics controller circuit, a difference between the expected value of the flight performance parameter and the current value of the flight performance parameter;

adjusting, by the avionics controller circuit, the at least one operation parameter used to determine the expected value of the flight performance parameter to reduce the difference between the expected value of the flight performance parameter and the current value of the flight performance parameter; and controlling, by the avionics controller circuit, operation of the airborne platform responsive to the adjusted at least one operation parameter.

17. The method of claim 16, wherein the flight performance parameter includes a fuel level of the airborne platform, and the sensor is a fuel level sensor.

18. The method of claim 16, wherein the flight performance parameter includes at least one of a fuel burn or a fuel burn rate of the airborne platform, and determining the expected value of the flight performance parameter includes determining the expected value of the flight performance parameter based on sensor data including at least one of a weight of the airborne platform, an entity state, or an ambient condition.

19. The method of claim 16, wherein the at least one operation parameter indicates an aircraft type of the airborne platform or a mission type to be performed by the airborne platform.

20. The method of claim 16, wherein the at least one operation parameter indicates an identifier of the airborne platform, the identifier associated with at least one of a torque determination error, an engine efficiency, a drivetrain efficiency, or a sensor calibration of the airborne platform.

* * * * *